Figure 1:
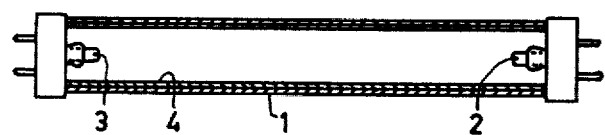

United States Patent [19]

Konijnendijk et al.

[11] 4,315,191

[45] Feb. 9, 1982

[54] LUMINESCENT MATERIAL WITH ALKALINE EARTH METAL SILICATE ALUMINATE HOST LATTICE AND LOW-PRESSURE MERCURY VAPOR DISCHARGE LAMP CONTAINING THE SAME

[75] Inventors: Willem L. Konijnendijk; Gert M. Boogerd; Henricus L. M. Tonnaer, all of Eindhoven, Netherlands

[73] Assignee: U.S. Philips Corporation, New York, N.Y.

[21] Appl. No.: 140,899

[22] Filed: Apr. 16, 1980

[30] Foreign Application Priority Data

Apr. 20, 1979 [NL] Netherlands .................. 7903102

[51] Int. Cl.$^3$ .................. C09K 11/467; C09K 11/463; H01J 61/44
[52] U.S. Cl. .................. 313/486; 252/301.4 R; 252/301.4 F
[58] Field of Search .................. 252/301.4 F, 301.4 R; 313/486

[56] References Cited

U.S. PATENT DOCUMENTS 4,088,599  5/1978  Suzuki et al. .................. 252/301.4 F
4,150,321  4/1979  Schetters et al. ............. 252/301.4 R

FOREIGN PATENT DOCUMENTS 46-43761  12/1971  Japan .......................... 252/301.4 F

OTHER PUBLICATIONS

Laud et al., "J. Electrochem Soc.", vol. 118, No. 6, 1971, pp. 918-923.

*Primary Examiner*—Jack Cooper
*Attorney, Agent, or Firm*—Norman N. Spain

[57] ABSTRACT

Luminescent alkaline earth metal silicate aluminate defined by the formula $Sr_{3-a-b}Ba_aCa_bSi_{1-y}Ge_yAl_{10-x}Ga_xO_{20}$; $Ce_p^{3+}$, $Eu_q^{2+}$, $Tb_r^{3+}$, wherein, if $r=0$, it holds that $0 \leq a+b \leq 1.5$
$0 \leq p \leq 0.75$
$0 \leq q \leq 0.25$
$0.001 \leq p+q$ and wherein, if $p+q=0$, it holds that $0 \leq a \leq 3.0$
$0 \leq b \leq 1.5$
$a+b \leq 3.0$
$0.01 \leq r \leq 1.0$.

The material is used in a luminescent screen, preferably in the luminescent screen of a low-pressure mercury vapor discharge lamp.

4 Claims, 4 Drawing Figures

LUMINESCENT MATERIAL WITH ALKALINE EARTH METAL SILICATE ALUMINATE HOST LATTICE AND LOW-PRESSURE MERCURY VAPOR DISCHARGE LAMP CONTAINING THE SAME

The invention relates to a luminescent material having an alkaline earth metal silicate aluminate host lattice. The invention further relates to a luminescent screen provided with such a luminescent material and to a low-pressure mercury vapour discharge lamp having such a luminescent screen.

Luminescent materials on the basis of an alkaline earth metal silicate aluminate lattice are known already. German Patent Application No. 2,028,376, which has been laid open to public inspection, describes, for example luminescent materials having as host materials of $BaAl_2Si_2O_8$(Ba-feldspar) and $SrAl_2Si_2O_8$(Sr-anorthite). When these lattices are activated by bivalent europium, efficiently luminescing materials are obtained. Bivalent europium-activated materials with mica structure are also known, for example $SrMg_2Al_2Si_2O_{10}F_2$; $Eu^{2+}$ (see Netherlands Patent Application No. 7,504,440).

It is an object of the invention to provide novel luminescent materials having the efficient luminescence desired for practical application.

A luminescent material with an alkaline earth metal silicate aluminate host lattice according to the invention is characterized in that the material is defined by the formula $Sr_{3-a-b}Ba_aCa_bSi_{1-y}Ge_yAl_{10-z}Ga_zO_{20}$; $Ce_p^{3+}$, $Eu_q^{2+}$, $Tb_r^{3+}$, wherein $0 \leq y \leq 0.5$ and $0 \leq Z \leq 2.0$, and if the material is activated by Ce or Eu (r=0), that:

$0 \leq a+b \leq 1.5$,
$0 \leq p \leq 0.75$
$0 \leq q \leq 0.25$
$0.001 \leq p+q$ and, if the material is activated by Tb (p+q=0), $0 \leq a \leq 3.0$
$0 \leq b \leq 1.5$
$a+b \leq 3.0$
$0.01 \leq r \leq 1.0$ A luminescent material according to the invention has as a host lattice on the compound $Sr_3SiAl_{10}O_{20}$. This is a novel compound having an orthorhombic crystal structure (with lattice constants: $a = 14.32 \pm 0.03$, $b = 11.32 \pm 0.02$, $c = 4.907 \pm 0.007$), similar to the structure of the compound $Pb_3SiAl_{10}O_{20}$, which is known from Monatshefte für Chemie, 101, 275 (1970). The materials according to the invention are activated by trivalent cerium, by bivalent europium or by trivalent terbium. These activators are built into the lattice in the Sr sites. When a trivalent activator is used, charge compensation must take place. This can be effected, for example, by substituting, together with the activator, an equal quantity of monovalent alkali ions in Sr-sites. Alternatively, it is possible to substitute trivalent Al in Si-sites and/or bivalent ions, such as Mg, in Al-sites. In the materials according to the invention a small quantity of the Si may be replaced by Ge and also a small quantity of the Al by Ga. The crystal structure is then retained and little influence on the luminescent properties is observed. However, a larger quantity of the above-mentioned, relatively expensive elements, affects the luminous flux negatively. Therefore, a maximum of 0.5 is chosen for the Ge-content y and a maximum of 2.0 for the Ga-content z. It further appears that in the materials activated by cerium or europium the strontium may be partly replaced by barium and/or calcium. A maximum of 1.5 is then chosen for the Ba+Ca-content a+b, as otherwise luminous fluxes are obtained which are too low. When the Sr is replaced to a small extent only, the orthorhombic structure is retained. When larger quantities of Ba are used, the monoclinic crystal structure of the novel compound $Ba_3SiAl_{10}O_{20}$ (lattice constants: $a = 7.630 \pm 0.007$, $b = 8.892 \pm 0.007$, $c = 13.113 \pm 0.012$, $\beta = 89°31' \pm 4'$) is then found in addition to the $Sr_3SiAl_{10}O_{20}$-structure. It appears that the monoclinic Ba-compound does not luminesce efficiently when it is activated by cerium or by europium. In the terbium-activated materials, the calcium content b must also be limited to a maximum of 1.5 in order to obtain high luminous fluxes. However, it appears that in that case Sr can be wholly replaced by Ba ($a \leq 3.0$), as the monoclinic $Ba_2SiAl_{10}O_{20}$ is very efficient when activated by terbium. The activator contents p, q and r are chosen within the above-defined imits. A very small quantity of an activator element can already result in an efficient luminescence. The activator contents are chosen so that they do not exceed the above-defined upper limits, as otherwise luminous fluxes are obtained which are too low, due to concentration quenching.

The $Ce^{3+}$-activated materials have a strong emission band in the ultra-violet part of the spectrum with a maximum at approximately 365 nm and a half-value width of approximately 55 nm. They can be properly excited with short-wave ultra-violet radiation and are therefore used to great advantage in the luminescent screen of low-pressure mercury vapour discharge lamps (predominantly 254 nm-excitation). These lamps are used for influencing photo-chemical processes.

When activated by bivalent europium materials are obtained which can be satisfactorily excited with both short-wave and long-wave ultra-violet radiation and which have an efficient, relatively wide-band emission in the blue part of the spectrum and a maximum at approximately 465 nm and half-value width of approximately 95 nm. Their use in the luminescent screen of, for example, low-pressure mercury vapour lamps furnishes many advantages, particularly if these materials are used in combination with other luminescent materials in such lamps for general lighting purposes.

The $Tb^{3+}$-activated materials have, when excited by, for example, short-wave ultra-violet radiation the characteristic, predominantly green, Tb-emission. These materials are particularly suitable for use in the luminescent screen of low-pressure mercury vapour discharge lamps for special purposes (for example electrophotography) and also as the green component in combination with other luminescent materials in such lamps for general lighting purposes.

Preference is given to materials according to the invention which are defined by the formula $Sr_{3-a-b}Ba_aCa_bSiAl_{10}O_{20}$; $Ce_p^{3+}$, wherein $0 \leq a+b \leq 1.0$ and $0.10 \leq p \leq 0.50$, and wherein charge compensation for the cerium is effected by substitution of Na and/or K in a Sr-place and/or by substitution of Al in a Si-place. Namely, in the case of activation by Ce, the highest radiant fluxes are found for the Ge- and Ga-free materials, the contents a, b and p being selected in the said ranges.

A second preferred group of materials according to the invention is defined by the formula $Sr_{3-a-b}Ba_aCa_bSiAl_{10}O_{20}$; $Eu_q^{2+}$, wherein $0 \leq a+b \leq 1.0$ and $0.01 \leq q \leq 0.15$. Namely, the most efficient $Eu^{2+}$-emission is obtained with these materials. As the bivalent europium replaces Sr-ions, charge compensation is not required here.

Finally, preference is given to a group of materials defined by the formula $Sr_{3-a}Ba_aSiAl_{10}O_{20}$; $Tb_r^{3+}$, wherein $0 \leq a \leq 3.0$ and $0.10 \leq r \leq 0.50$, and wherein charge compensation for the terbium has been done by substitution of Na and/or K in a Sr-place and/or by substitution of Al in a Si-place. The most efficient Tb-emission is obtained with the above-mentioned values for a and r, charge compensation being performed as indicated here.

The luminescent materials according to the invention can be prepared by means of a solid state reaction at a high temperature of a mixture of starting materials containing the component elements, for example the oxides or compounds yielding these oxides on heating. Generally, the luminescent materials are prepared by heating in a weakly reducing atmosphere. It is often advantageous to perform the heating operation in several steps, the reaction product being cooled and homogenized between each step. The use of a slight excess of $SiO_2$ may promote the reaction. It is, in general, not necessary to remove the excess of $SiO_2$ from the reaction product.

Some embodiments of the invention will now be described with reference to a drawing and a number of examples and measurements.

In the drawing

Figure 2:
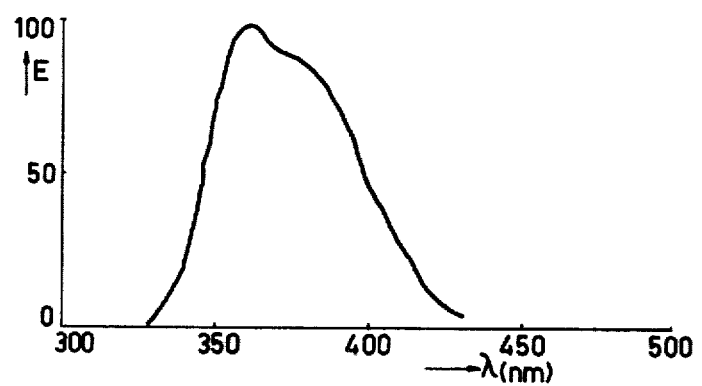
Figure 3:
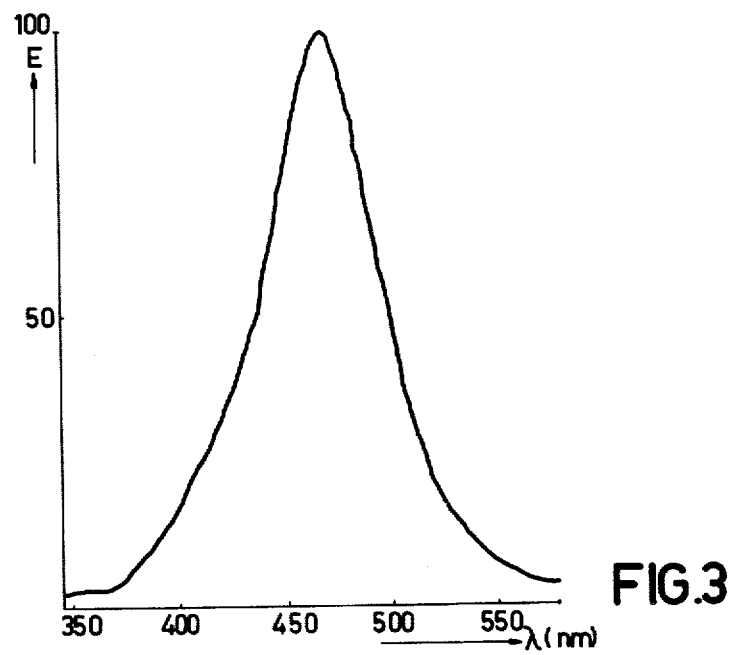
Figure 4:
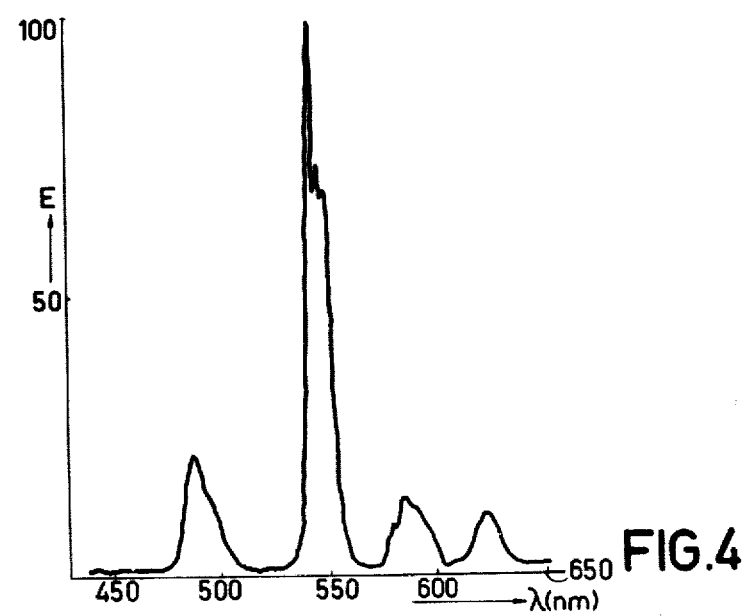

FIG. 1 shows schematically and in cross-section a low-pressure mercury vapour discharge lamp comprising a luminescent screen according to the invention, FIG. 2 shows the emission spectrum of a material activated by Ce, FIG. 3 shows the emission spectrum of a material activated by Eu and FIG. 4 shows the emission spectrum of a material activated by Tb.

In FIG. 1 reference numeral 1 denotes the glass wall of a low-pressure mercury vapour discharge lamp according to the invention. Electrodes 2 and 3 are disposed, one at each end of the lamp, the discharge taking place between these electrodes during operation of the lamp. The lamp contains a rare gas, which serves as the starting gas, and also a small quantity of mercury. The inside of the wall 1 is coated with a luminescent layer 4, which contains a luminescent material according to the invention. The layer 4 can be provided in a customary manner on the wall 1, for example by means of a suspension containing the luminescent material.

EXAMPLE 1

A mixture is made of 6.503 g $SrCO_3$
0.942 g $SiO_2$
0.258 g $CeO_2$
7.723 g $Al_2O_3$.

This mixture was heated for 2 hours in a furnace at a temperature of 1550° C., nitrogen containing 2% by volume of hydrogen, which was first passed through water having a temperature of 20° C., being passed through the furnace. After cooling and pulverizing, the product obtained was once again subjected to the same temperature treatment. After cooling and homogenizing, it appeared that a luminescent silicate-aluminate was obtained defined by the formula $Sr_{2.9}Ce_{0.1}Si_{0.9}Al_{10.1}O_{20}$. When excited by short-wave ultra-violet radiation (predominantly 254 nm), this material appeared to emit in the near part of the ultra-violet spectrum. FIG. 2 shows the spectrum of the emitted radiation. In this Figure, the wavelength $\lambda$ is plotted in nm on the horizontal axis and the radiation energy E in arbitrary units on the vertical axis. The peak height P of the emission band appeared to be 57% with respect to the peak height of the known, lead-activated barium silicate which emits in the same part of the spectrum, but which has a narrower emission band. The absorption A of the exciting (254 nm-) radiation was 79%.

In a similar manner as described in the above example a number of Ce-activated materials was obtained. The formulae of these materials, as well as the results of peak height P measurements (in % of the above-mentioned standard) and of absorption A (in %) are summarized in the following Table I. The examples 1 to 5, inclusive, show the influence of the Ce-concentration. The examples 6 to 9, inclusive, show Ba- and Ca-containing materials. In the examples 10 and 11 charge compensation, by means of Na or K, has been effected.

TABLE I

| Example | Formula | P | A |
|---|---|---|---|
| 1 | $Sr_{2.9}Ce_{0.1}Si_{0.9}Al_{10.1}O_{20}$ | 57 | 79 |
| 2*) | $Sr_{2.8}Ce_{0.2}Si_{0.8}Al_{10.2}O_{20}$ | 66 | 87 |
| 3 | $Sr_{2.7}Ce_{0.3}Si_{0.7}Al_{10.3}O_{20}$ | 66 | 89 |
| 4 | $Sr_{2.6}Ce_{0.4}Si_{0.6}Al_{10.4}O_{20}$ | 63 | 92 |
| 5 | $Sr_{2.5}Ce_{0.5}Si_{0.5}Al_{10.5}O_{20}$ | 58 | 91 |
| 6 | $Sr_{2.15}Ba_{0.6}Ce_{0.25}Si_{0.75}Al_{10.25}O_{20}$ | 58 | 90 |
| 7 | $Sr_{1.75}Ba_{1.0}Ce_{0.25}Si_{0.75}Al_{10.25}O_{20}$ | 66 | 89 |
| 8 | $Sr_{2.15}Ca_{0.6}Ce_{0.25}Si_{0.75}Al_{10.25}O_{20}$ | 64 | 90 |
| 9 | $Sr_{1.75}Ca_{1.0}Ce_{0.25}Si_{0.75}Al_{10.25}O_{20}$ | 62 | 92 |
| 10 | $Sr_{2.50}Na_{0.25}Ce_{0.25}SiAl_{10}O_{20}$ | 74 | 90 |
| 11 | $Sr_{2.50}K_{0.25}Ce_{0.25}SiAl_{10}O_{20}$ | 81 | 91 |

*)It appeared that a low-pressure mercury vapour discharge lamp of the type described with reference to FIG. 1 (40 W), provided with this luminescent material (quantum efficiency approximately 65%) showed, after 100 hours burning, a decay of the radiant flux of only 5.8%. By way of comparison it should be noted that lamps provided with the above-mentioned material used as the standard, appeared to have a decay of 12.1% after having been in operation for 100 hours.

EXAMPLE 12

A material activated by Eu was prepared by a method similar to that described in Example 1, starting from a mixture of 6.723 g $SrCO_3$
1.571 g $SiO_2$ (50% excess)
7.647 g $Al_2O_3$
0.027 g $Eu_2O_3$.

The emission spectrum (at 254 nm excitation) of the material obtained, which is defined by the formula $Sr_{2.99}Eu_{0.01}SiAl_{10}O_{20}$, is shown in FIG. 3.

Three additional, Eu-activated, materials were prepared by means of the same method as described in Example 12. The formulae of these materials and results of the measurements of peak height ph and absorption A (in %) are summarized in Table II. The peak height is now indicated in % with respect to a known, Eu-activated, Ba-Mg aluminate.

TABLE II

| Example | Formula | ph | A |
|---|---|---|---|
| 12 | $Sr_{2.99}Eu_{0.01}SiAl_{10}O_{20}$ | 30 | 72 |
| 13 | $Sr_{2.98}Eu_{0.02}SiAl_{10}O_{20}$ | 30 | 80 |
| 14* | $Sr_{2.97}Eu_{0.03}SiAl_{10}O_{20}$ | 33 | 85 |
| 15 | $Sr_{2.94}Eu_{0.06}SiAl_{10}O_{20}$ | 26 | 91 |

*This material had a quantum efficiency of approximately 50%.

EXAMPLE 16

Tb-activated materials according to the invention were prepared by means of a similar method as described for Example 1, a material defined by the formula $Sr_{2.4}Tb_{0.3}Na_{0.3}SiAl_{10}O_{20}$ being obtained. The graph of FIG. 4 shows the characteristic Tb-emission of this material (at 254-nm-excitation). The quantum efficiency of this material was approximately 45%. A material defined by the formula $Ba_{2.7}Tb_{0.3}Si_{0.7}Al_{10.3}O_{20}$, having a quantum efficiency of approximately 53%, was also prepared.

What is claimed is:

1. A terbium or cerium activated alkaline earth metal silicate aluminate luminescent material having a composition selected from the formulae:

$$Sr_{3-a}Ba_aSiAl_{10}O_{20}:Tb_r^{3+}$$

wherein $0 \leq a \leq 3.0$ and $0.10 \leq r \leq 0.50$ and wherein charge compensation for the terbium is achieved by substitution of Na and/or K in a Sr site and/or by Al in a Si site and;

$$Sr_{3-a-b}Ba_aCa_bSiAl_{10}O_{20}:Ce_p^{3+}$$

wherein $0 \leq a+b \leq 1.0$ and $0.10 \leq p \leq 0.50$ and wherein charge compensation for the cerium is achieved by substitution of Na and/or K in a Sr site and/or Al in a Si site.

2. A luminescent material as claimed in claim 1, characterized in that the material is defined by the formula $Sr_{3-a-b}Ba_aCa_bSiAl_{10}O_{20}$; $Ce_p^{3+}$, wherein $0 \leq a+b \leq 1.0$ and $0.10 \leq p \leq 0.50$, and wherein charge compensation for the cerium is performed by substitution of Na and/or K in a Sr-site and/or by substitution of Al in a Si-site.

3. A luminescent material as claimed in claim 1, characterized in that the material is defined by the formula $Sr_{3-a-r}Ba_aSiAl_{10}O_{20}$; $Tb_r^{3+}$, wherein $0 \leq a \leq 3.0$ and $0.10 \leq r \leq 0.50$, and wherein charge compensation for the terbium is effected by substitution of Na and/or K in a Sr-site and/or by substitution of Al in a Si-site.

4. A low-pressure mercury vapor discharge lamp comprising a glass envelope having electrodes at opposite ends of said envelope and, disposed on the inside side wall of said envelope, a luminescent material of claims 2 or 3.

* * * * *